Dec. 24, 1935.   G. D. JOHNSON   2,025,288
PISTON ROD
Filed May 23, 1933
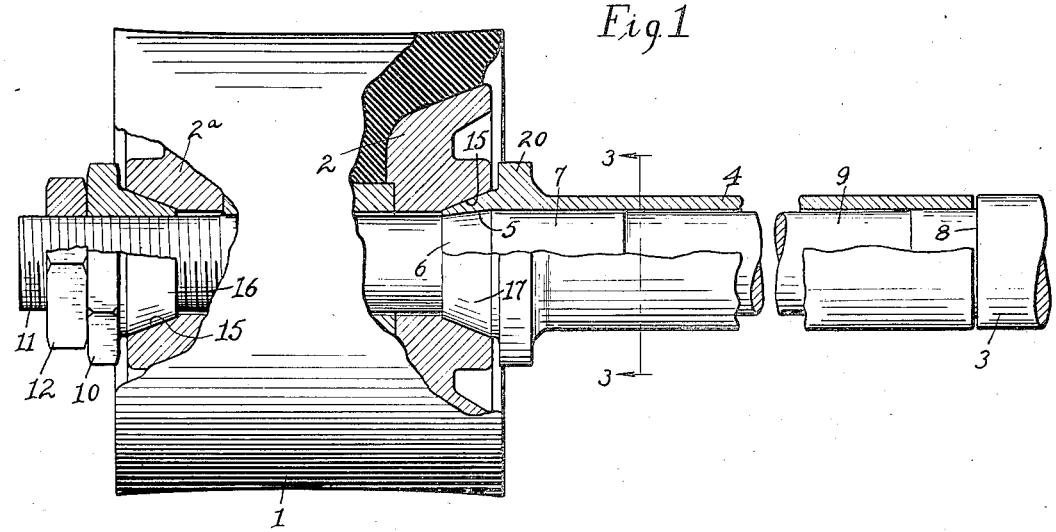
INVENTOR.
GLENN D. JOHNSON
BY R. W. Smith
ATTORNEY.

Patented Dec. 24, 1935

2,025,288

UNITED STATES PATENT OFFICE 2,025,288

PISTON ROD

Glenn D. Johnson, Compton, Calif., assignor to J. Warren MacClatchie, doing business as Mac-Clatchie Manufacturing Company, Compton, Calif.

Application May 23, 1933, Serial No. 672,424

11 Claims. (Cl. 309—23)

This invention relates to piston rods, and is illustrated applied to a piston rod for a slush pump.

It is the object of the invention to provide a detachable sleeve for a piston rod adapted for replacement when worn so that the piston rod itself need not be discarded, and having means for securely but readily detachably assembling the sleeve with relation to the piston rod so as to provide for replacement of the sleeve without disconnecting the piston rod from the cross-head.

It is a further object of the invention to detachably secure the replaceable sleeve and the piston by a single locking means, so that both the piston and the sleeve may be readily replaced as a part of one simple operation, with the entire assembly secured by the one locking means.

It is a still further object of the invention to provide a tapering engagement for securing the piston on its rod, and to employ such a gradual taper as will tightly wedge the retaining elements of the piston, rather than employing such an abrupt taper as will simply center the retaining elements while relying merely on a longitudinal clamping engagement.

It is a still further object of the invention to tightly wedge the replaceable sleeve on the piston rod, and to provide a construction whereby one of the retaining elements of the piston may be tightly wedged on the replaceable sleeve, with the latter in turn tightly wedged on the piston rod so as to provide a simple construction adapted for secure assembly by a single locking means.

It is a still further object of the invention to provide a wedging engagement between one of the retaining elements and the sleeve, and a wedging engagement between the sleeve and the piston rod, with these wedging engagements of such different taper that the wedging engagement for the retaining element may be released for ready removal of the piston, without releasing the sleeve when only the piston is to be replaced, or by use of a usual sleeve puller the wedging engagement for the sleeve may be released after the piston has been removed, so that the sleeve may be pulled off the piston rod without disturbing the connection between the rod and the cross-head.

Further objects of the invention will be readily understood from the following description of the accompanying drawing, in which:

Fig. 1 is a side elevation of a piston and its rod constructed in accordance with the invention, partly broken away in axial section.

Fig. 2 is a side elevation of the piston rod, with the piston removed and the replaceable sleeve shown broken away in axial section and partially withdrawn from the piston rod.

Fig. 3 is an enlarged transverse section on the line 3—3 of Fig. 1.

The invention is illustrated in connection with a piston assembly for a slush pump, wherein a piston 1, of yieldable material such as rubber, is clamped between end retaining plates 2—2a, with the piston and the retaining plates mounted on one end of piston rod 3, which at its opposite rearwardly projecting end is secured to a usual cross-head (not shown). A wear resisting replaceable sleeve 4 is mounted on the piston rod; and the invention provides a simple but efficient means for securely but readily detachably assembling the sleeve with relation to the rod.

For this purpose the sleeve 4 is adapted for sliding reception on rod 3, being slid over the forwardly projecting piston receiving end of the rod, and the bore of the sleeve and the periphery of the rod have cooperating conical tapering surfaces 5—6, the conical bore 5 being at the forward end of the sleeve and the cooperating conical surface 6 being adjacent the forwardly projecting piston receiving end of the rod whereby the forward end of the sleeve may be tightly wedged on the rod as shown in Fig. 1, with the rearwardly projecting portion of the rod which receives the sleeve being of reduced diameter as shown at 7 and merging into the taper 6 at one end and forming a radially projecting shoulder 8 at its opposite end, so that when the sleeve is in place its outer periphery forms a uniform continuation of the periphery of the rod. The wedging engagement 5—6 is of relatively slight taper so that the sleeve may be tightly wedged on the rod, and the end portions of the part 7 of the rod which engages the sleeve, are adapted for snug sliding reception of the sleeve, while the intermediate portion of the sleeve engaging part of the rod is preferably of slightly reduced diameter adapted to clear the rod as shown at 9.

The assembly of the piston on the piston rod provides means for securing the sleeve 4 in its operative position wedged on the rod; and for this purpose the retaining plate 2 engages the proximate end of sleeve 4, so that when a nut 10 is threaded onto the threaded end 11 of the piston rod for engagement with the opposite retaining plate 2a, the piston 1 is clamped between the retaining plates and at the same time the plate 2 forces the sleeve 4 to its operative position with the conical surfaces 5—6 tightly engaged. When the parts are operatively assembled the plate 2 surrounds the end of the replaceable sleeve which has the conical bore 5, thereby holding the end of the sleeve against spreading when wedged onto the conical surface 6, and thus maintaining the wedging engagement. It will thus be seen that the nut 10, which is preferably provided with a usual lock nut 12, is adapted to not only secure the piston in assembled relation, but also provides a locking means for retaining the sleeve 4 in operative position, with removal of the nut 10 permitting ready removal of the piston, whereupon the wedging engagement 5—6 may be released and the sleeve 4 withdrawn at the threaded end 11 of the piston rod, by engaging the replaceable sleeve by any usual sleeve puller (not shown).

The invention preferably also provides means for tightly radially wedging the retaining plates 2—2a on the piston rod, rather than simply centering the plates and then merely longitudinally clamping them on the piston rod; and this wedging engagement for the retaining plates preferably cooperates with the wedging engagement between the piston rod and its replaceable sleeve, whereby the wedging engagement for the retaining plates is adapted to tighten the wedging engagement for the replaceable sleeve. As an instance of this arrangement the outer ends of the bores of plates 2—2a are conically tapered as shown at 15, and the nut 10 and the end of sleeve 4 are correspondingly conically tapered as shown at 16 and 17 respectively, with the cooperating cones 15—16 and 15—17 of relatively gradual taper so that when the nut 10 is tightened, the plate 2 longitudinally forces the sleeve 4 to its operative position so as to form a tight wedging engagement at the cooperating slightly tapering surfaces 5—6, and at the same time the plate 2 is tightly radially wedged on sleeve 4, and the plate 2a is similarly tightly radially wedged on nut 10.

The taper at 15—16 and at 15—17, while a relatively gradual taper, is of somewhat greater taper than the cooperating tapering surfaces 5—6, so that when nut 10 is tightened the sleeve 4 is first tightly wedged on rod 3, with the taper 15—17 tending to tighten this wedging engagement, and the follower plates 2—2a are then actually wedged on the piston rod rather than merely centering the follower plates and then relying on simply a longitudinal clamping action for securing the piston in assembled relation. As an instance of this arrangement the taper 15—16 and 15—17 may be approximately twenty degrees, with the taper 5—6 approximately six degrees, thereby insuring tight wedging engagements.

Both the replaceable sleeve 4 and the piston 1 are thus securely held in assembled relation by tightening the nut 10; and by removing the nut 10 the piston may be replaced without disturbing the sleeve 4, since the wedging engagement 15—17 may be released while still maintaining a tight wedging engagement at the cooperating surfaces 5—6 which are of less taper, or the sleeve 4 may also be replaced after removal of the piston has released the tension exerted by the wedging engagement 15—17 on the wedging engagement 5—6. To remove the sleeve 4 it is only necessary to engage a shouldered head 20 of sleeve 4 by any usual sleeve puller, so as to pull the sleeve toward the threaded end 11 of the piston and thus release the wedging engagement 5—6 as shown at Fig. 2, whereupon the replaceable sleeve may be readily withdrawn without disturbing the connection between the piston rod and the usual cross-head at the outer end of the rod.

The invention thus provides an extremely simple but rigidly assembled structure, with both the piston and the replaceable sleeve securely held on the piston rod by tightening the nut 10, and with the replaceable sleeve tightly wedged on the rod, and the piston also tightly wedged on the rod and adapted to tension the wedging engagement between the sleeve and the rod. The invention also provides for ready removal of the piston without disturbing the replaceable sleeve and simply by removing the nut 10, and also provides for removing the replaceable sleeve after the piston has been displaced, without disturbing the connection between the piston rod and the cross-head.

I claim:

1. In combination, a piston rod cylindrical throughout the major portion of its length and merging into a conical surface terminating in a piston receiving end of the rod which is of reduced diameter, and a sleeve having a bore cylindrical throughout the major portion of its length and merging into a conical bore at one end, the sleeve being adapted for reception on the rod with snug sliding fit of the cylindrical bore on the cylindrical major portion of the rod, and the conical bore wedging tightly on the conical surface of the rod.

2. In combination, a piston rod cylindrical throughout the major portion of its length and merging into a conical surface terminating in a piston receiving end of the rod which is of reduced diameter, the intermediate part of the cylindrical portion of the rod being of slightly reduced diameter, and a sleeve having a bore cylindrical throughout the major portion of its length and merging into a conical bore at one end, the sleeve being adapted for reception on the rod with the cylindrical bore clearing the reduced intermediate part of the cylindrical portion of the rod and sliding snugly on said rod beyond the respective ends of said intermediate part, and the conical bore of the sleeve being adapted to wedge tightly on the conical surface of the rod.

3. In combination, a piston rod having a piston receiving end and an opposite rearwardly projecting end, and a sleeve adapted to be slid over the piston receiving end of the rod for reception on the rearwardly projecting end of the rod, the rod and sleeve having cooperating tapering means at the forward end of the sleeve and adjacent the piston receiving end of the rod for wedging the forward end of the sleeve on the rod.

4. In combination, a piston rod having a piston receiving end and an opposite rearwardly projecting end, a sleeve adapted to be slid over the piston receiving end of the rod for reception on the rearwardly projecting end of the rod, the rod and sleeve having cooperating tapering means at the forward end of the sleeve and adjacent the piston receiving end of the rod for wedging the forward end of the sleeve on the rod, and a retaining element for a piston adapted to be slid over the piston receiving end of the rod for reception on the forward end of the sleeve so as to maintain the forward end of the sleeve wedged on the rod.

5. In combination, a piston rod having a piston receiving end and an opposite rearwardly projecting end, a sleeve adapted to be slid over the piston receiving end of the rod for reception on the rearwardly projecting end of the rod, the rod and sleeve having cooperating tapering means at the forward end of the sleeve and adjacent the piston receiving end of the rod for wedging the forward end of the sleeve on the rod, and a retaining element for a piston adapted to be slid over the piston receiving end of the rod for reception on the forward end of the sleeve, the retaining element and the forward end of the sleeve having cooperating tapering means for wedging the retaining element on the forward end of the sleeve so as to maintain the forward end of the sleeve wedged on the rod.

6. In combination, a piston rod having a piston receiving end and an opposite rearwardly projecting end, a sleeve adapted to be slid over the piston receiving end of the rod for reception on the rearwardly projecting end of the rod, the rod and sleeve having cooperating tapering means at the forward end of the sleeve and adjacent the piston receiving end of the rod for wedging the forward end of the sleeve on the rod, and a retaining element for a piston adapted to be slid over the piston receiving end of the rod for reception on the forward end of the sleeve, the retaining element and the forward end of the sleeve having cooperating tapering means for wedging the retaining element on the forward end of the sleeve so as to maintain the forward end of the sleeve wedged on the rod, the last mentioned cooperating tapering means being of greater taper than the first mentioned tapering engagement.

7. In combination, a piston rod having a piston receiving end and an opposite rearwardly projecting end, a sleeve adapted to be slid over the piston receiving end of the rod for reception on the rearwardly projecting end of the rod, the rod and sleeve having cooperating tapering means at the forward end of the sleeve and adjacent the piston receiving end of the rod for wedging the forward end of the sleeve on the rod, and an exterior shoulder at the forward end of the sleeve adapted for engagement for releasing the wedging engagement and withdrawing the sleeve at the piston receiving end of the rod.

8. In combination, a piston rod having a piston receiving end and an opposite rearwardly projecting end, and a sleeve adapted to be slid over the piston receiving end of the rod for reception on the rearwardly projecting end of the rod, the rod and sleeve having cooperating means at the forward end of the sleeve and adjacent the piston receiving end of the rod for limiting rearward sliding movement of the sleeve on the rod.

9. In combination, a piston rod having a piston receiving end and an opposite rearwardly projecting end, and a sleeve adapted to be slid over the piston receiving end of the rod for reception on the rearwardly projecting end of the rod, the rod and sleeve having cooperating means at the forward end of the sleeve and adjacent the piston receiving end of the rod for centering the forward end of the sleeve on the rod.

10. In combination, a piston rod having a piston receiving end and an opposite rearwardly projecting end, and a sleeve adapted to be slid over the piston receiving end of the rod for reception on the rearwardly projecting end of the rod, the rod and sleeve having cooperating means at the forward end of the sleeve and adjacent the piston receiving end of the rod for centering the forward end and limiting rearward sliding movement of the sleeve on the rod.

11. In combination, a piston rod having a piston receiving end and an opposite rearwardly projecting end, and a sleeve adapted to be slid over the piston receiving end of the rod, for reception on the rearwardly projecting end of the rod, the rod and sleeve having cooperating means at the forward end of the sleeve and adjacent the piston receiving end of the rod for limiting rearward sliding movement of the sleeve on the rod, and a retaining element for a piston adapted to be slid over the piston receiving end of the rod for reception on the forward end of the sleeve so as to maintain the sleeve limited against rearward sliding movement on the rod, the retaining element and the forward end of the sleeve having cooperating means for limiting rearward sliding movement of the retaining element on the forward end of the sleeve.

GLENN D. JOHNSON.